(12) United States Patent
Cheng-Hung et al.

(10) Patent No.: US 6,397,232 B1
(45) Date of Patent: May 28, 2002

(54) METHOD AND SYSTEM FOR TRANSLATING THE FORMAT OF THE CONTENT OF DOCUMENT FILE

(75) Inventors: Sun Cheng-Hung; Fang Chien-Kuo; Tai Chia-Yang, all of Taipei Hsien (TW)

(73) Assignee: Acer Inc., Taipei Hsein (TW)

( * ) Notice: Subject to any disclaimer, the term of this patent is extended or adjusted under 35 U.S.C. 154(b) by 0 days.

(21) Appl. No.: 09/934,828

(22) Filed: Aug. 23, 2001

(30) Foreign Application Priority Data

Feb. 2, 2001 (TW) .................................. 090102244 A

(51) Int. Cl.[7] .............................................. G06F 17/30
(52) U.S. Cl. ...................... 707/523; 707/513; 707/522; 707/10
(58) Field of Search ................................ 707/522, 523, 707/513, 501.1, 1, 10, 100, 104.1; 709/200, 217–219

(56) References Cited

U.S. PATENT DOCUMENTS

| | | | | |
|---|---|---|---|---|
| 5,299,304 A | * | 3/1994 | Williams et al. | 707/523 |
| 5,713,014 A | * | 1/1998 | Durflinger et al. | 707/102 |
| 5,911,776 A | * | 6/1999 | Guck | 707/104.1 |
| 5,970,490 A | * | 10/1999 | Morgenstern | 707/10 |
| 6,012,098 A | * | 1/2000 | Bayeh et al. | 709/200 |
| 6,151,608 A | * | 11/2000 | Abrams | 707/100 |
| 6,236,997 B1 | * | 5/2001 | Bodamer et al. | 707/10 |
| 6,263,332 B1 | * | 7/2001 | Nasr et al. | 707/104.1 |
| 6,324,568 B1 | * | 11/2001 | Diec | 709/203 |
| 6,336,124 B1 | * | 1/2002 | Alam et al. | 707/523 |

OTHER PUBLICATIONS

Burns et al, "Open Tag and TMX: XML in the Localization Industry", ACM 1–58113–004–X/98/0009, Proceedings of the 16th annual int'l conf. on Computer documentation, Sep. 1998, pp. 137–142.*

Sirer, et al, "Design and Implementation of a Distributed Virul Machine for Networked Computers", ACM 1–58113–140–2/99/0012, 17th ACM Symposium on Operating System Principles, published as Operating Systems Review, 34(5):202–216, Dec. 1999.*

* cited by examiner

Primary Examiner—Joseph H. Feild
(74) Attorney, Agent, or Firm—Bacon & Thomas

(57) ABSTRACT

A method and a system for translating a format of a content of document file, applied to a network environment with a plurality of data processing systems. Each of the data processing systems includes a respective document database having a plurality of document files, and the document files of each document database is respective to a standard format. While a first data processing system intends to forward a document file to a second data processing system, the first data processing system can retrieve the document file with respect to a first standard format from the document database. Then, the first data processing system can translate the document file into a pre-map data file. Thereafter, the first data processing system can map the pre-map data file onto a second standard format data file and can further send out the second standard format data file.

22 Claims, 9 Drawing Sheets

METHOD AND SYSTEM FOR TRANSLATING THE FORMAT OF THE CONTENT OF DOCUMENT FILE

REFERENCE TO RELATED APPLICATION

The present application claims priority to Taiwan application No.090102244, entitled "Method and System for Translating the Format of the Content of Document File," filed on Feb. 2, 2001.

BACKGROUND OF THE INVENTION

(1) Field of the Invention

The invention relates to a method and a system for translating the format of the content of document file, and more particularly to a method and a system which utilize translators and mappers to translate the format of the content of document file.

(2) Description of the Prior Art

In a network environment, interconnection established among multiple data processing systems makes possible the electronic commerce and many business entities conduct their business behavior through the internet communication. Hence, how to communicate or interchange electronic document files between different data processing systems becomes more and more crucial.

In the art, every data processing system can define a format for the content of its own document file in accordance with a standard format, so that interchanging of document files among different systems can be feasible. In this description, the document file can be an order sheet, an invoice, or any document file containing specific data. It is easy to see that the so-called document file in this application can be different document file type. For instance, different formats of order sheets and invoices are usually provided by different data processing systems. Yet, generally speaking, the form of order sheet always includes company title, merchandise name, price, delivery info and so on; and the form of invoice always includes merchandise name, unit price, order amount and so on.

Because different data processing systems provide different standard formats of document files (order sheets for example) for electronic data exchange, a format translation upon the document file for exchanging is required so that the document file can be accepted by another data processing system. Generally, each of the document file types is individually an extensible markup language (XML) file. Therefore, even in the same data processing system, different document file types such as order sheets and invoices are presented with specific XML files.

When a data processing system is assigned to transform a document file from a first standard format to a second standard format, a compiling rule file with respect to the second standard format is required. The compiling rule file is written in the extensive style language (XSL). In the art, each XML file is corresponding to a specific XSL file. That is, more document file types are included in the data processing system, more XSL files exist as well. Similarly, more standard formats are used, and more XSL files are required.

Referring to FIG. 1, a conventional data processing system 10 is shown. The data processing system 10, for instance, includes three document files A, B and C with different individual standard formats; say, an order form, an invoice and a receipt sheet. In the network with the data processing system 10, three more data processing system X, Y and Z are required at least to handle file translating with respect to the data processing system 10 before any electronic file exchanging is possible. Hence, the data processing system 10 requires at least nine compiling rule files (XSL files) a-i, as shown, to process the exchanging of the document files.

Conventionally, in the case that a data processing system includes M document file types and the data processing system needs to exchange document files with N standard formats, M×N XSL files are required to be established in the data processing system. It is obviously in the art that for every additional document file type, a specific number, N in this example, of standard XSL files needs to be generated for each existence of standard format. Similarly, for every additional standard format in the data processing system, additional M XSL files are required to account for each document file type. Therefore, the fact that a huge number of XSL files exist in the conventional data processing system leads definitely to less efficiency in data processing, and it also limits the electronic exchanging of document files in the network.

SUMMARY OF THE INVENTION

Accordingly, it is a primary object of the present invention to provide a method and a system that utilize a translator and a mapper to translate a format of a content of document file. In this system, the data processing system can use the translator to translate a document file with a specific format into a respective pre-map data file with a predetermined content format. Then, the mapper is introduced to map the pre-map data file onto a standard format data file with the target standard format. In this present invention, the data processing system can have a plurality of compiling rule files (XSL files) stored in the translator, in which the compiling rule files are applied to translate the document file into the pre-map data file. The data processing system can also have a plurality of mapping rule files (XSL files) stored in the mapper, in which the mapping rule files are applied to map the pre-map data file onto a respective standard format data file with a required standard format.

In the present invention, the number of the compiling rule files is equal to the number of formats for document files; i.e., each compiling rule file is respective to a document file type. Also, the number of the mapping rule files is equal to the number of standard formats; i.e., each mapping rule file is respective to a standard format. Hence, in the case that the data processing system includes M document file types and needs to perform file-exchange with N standard formats, the data processing system then requires only M+N XSL files. Furthermore, for every additional document file type, the data processing system needs to add an XSL file of compiling rule file. Equally, for every additional standard format, the data processing system only needs to add an XSL file of mapping rule file.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and a system for translating the format of the content of document file. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
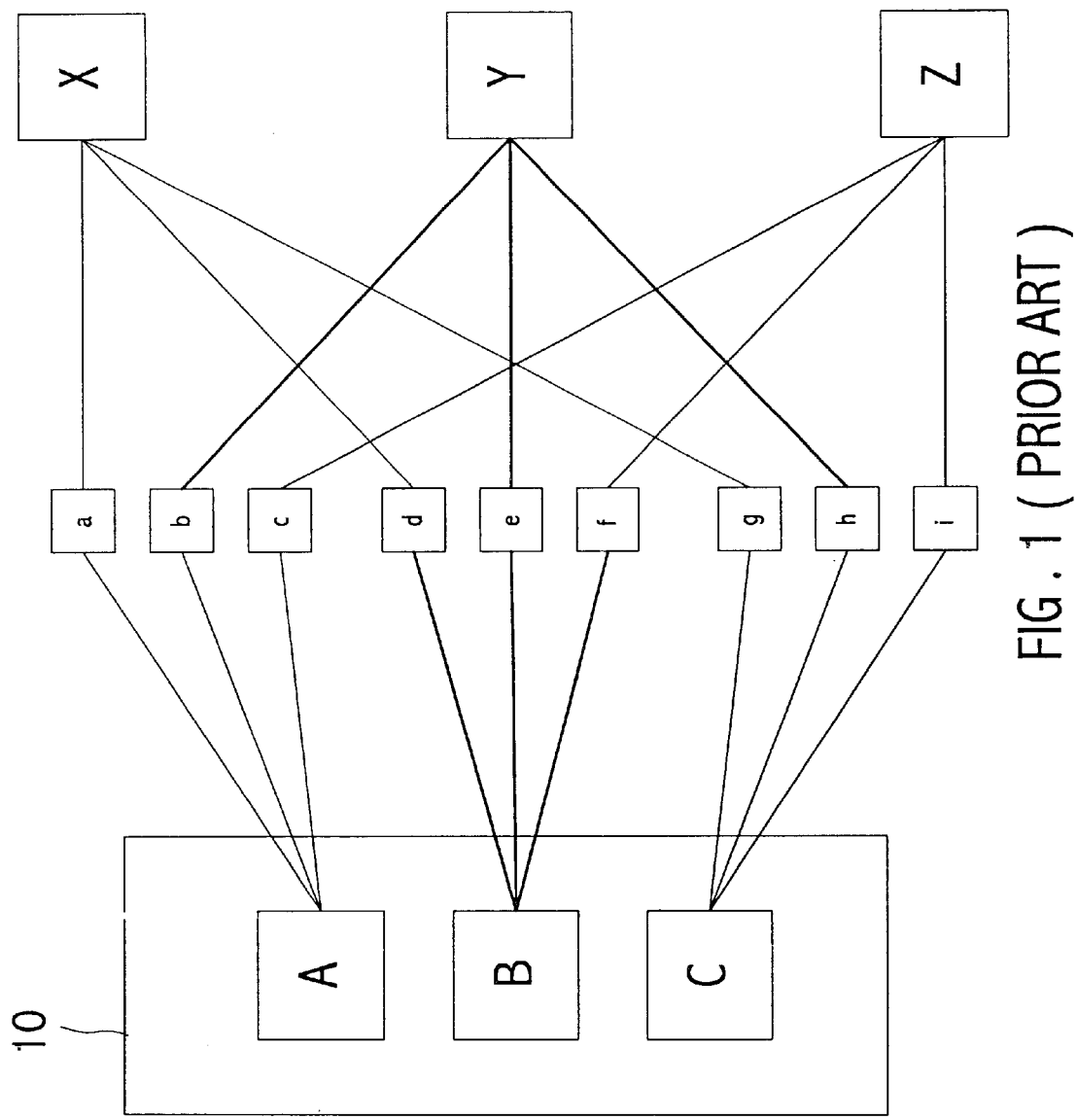
FIG. 1 is a schematic view of a data processing system in the art.
Figure 2:
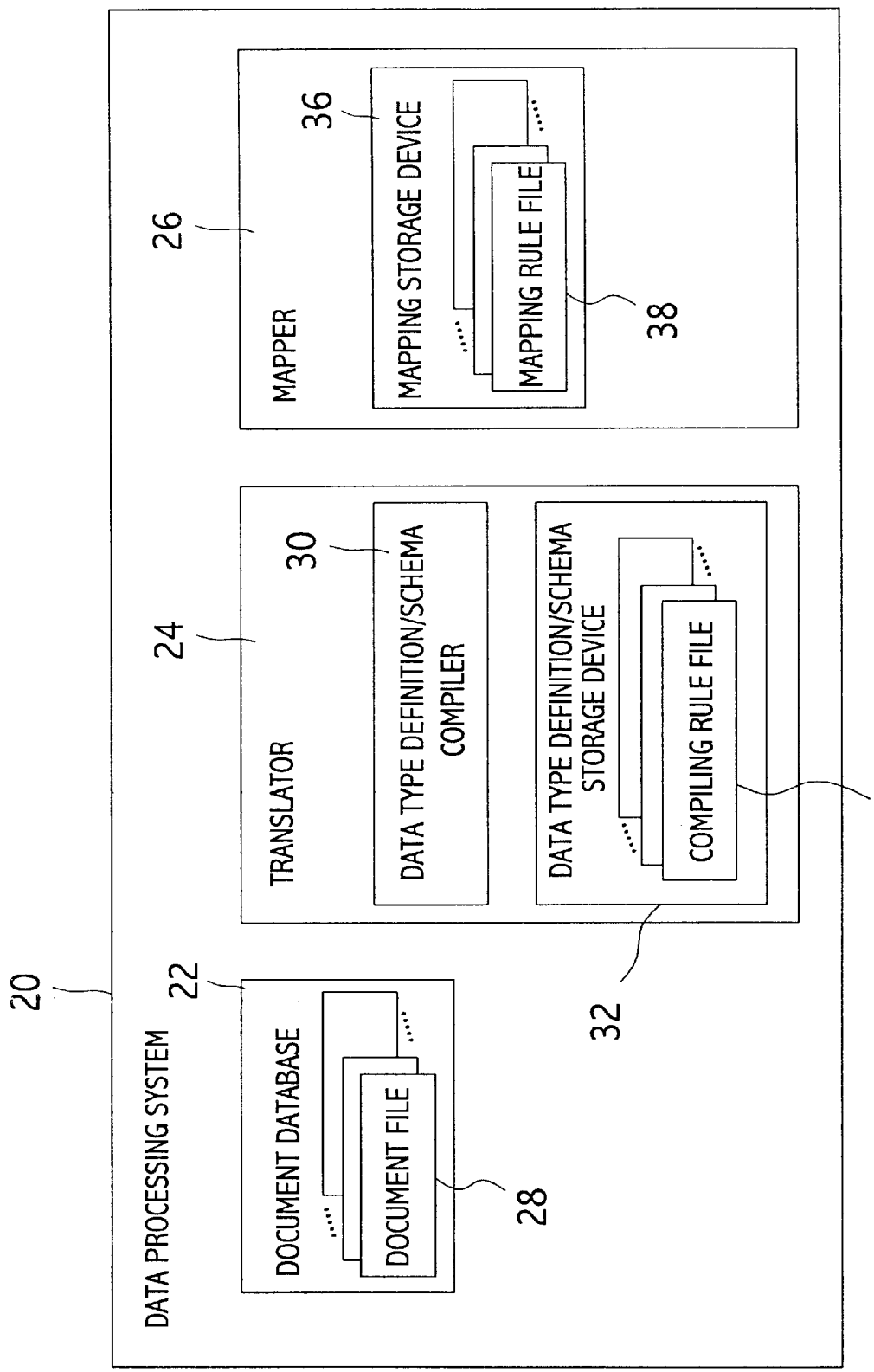
FIG. 2 is a schematic view of a data processing system in accordance with the present invention.

Referring now to FIG. 2, a data processing system 20 in accordance with the present invention is schematically shown. The data processing system 20 includes a document database 22, a translator 24 and a mapper 26. The document database 22 can include a plurality of document files 28 with respective a first standard format. The translator 24 can include a data file definition/schema (DTD/schema) translator 30 for translating the document files 28 and a data type definition/schema (DTD/schema) storage device 32 for storing a plurality of compiling rule files 34. Each of the compiling rule files 34 is respective to a document file type. In the data processing system 20, all the compiling rule files 34 follow an identical package of translating rules. The mapper 26 can include a mapping storage device 36 for storing a plurality of mapping rule files 38, and each of the mapping rule files 38 is respective to a standard format.

Figure 3:
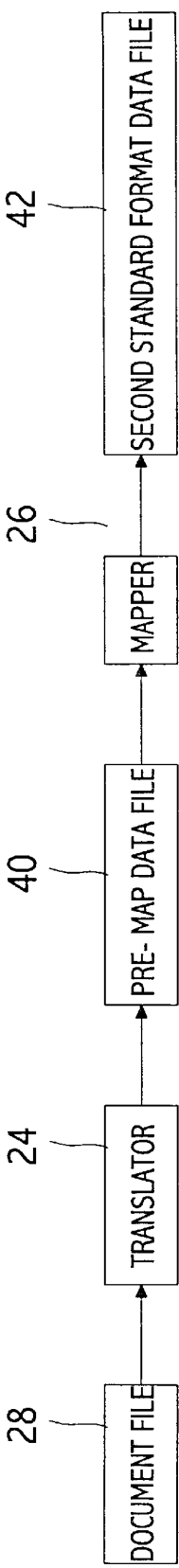
FIG. 3 is a flowchart showing the translating of a content format of a document file provided by the data processing system of the present invention.

Referring now to FIG. 3, it is shown that the data processing system 20 performs the translating the content format upon the document file 28. In the case that the data processing system 20 intends to forward the document file 28 to another data processing system, firstly the data processing system 20 retrieves the document file 28 from the document database 22 in which the document file 28 is respective to the first standard format. Then, the data processing system 20 uses the translator 24 to translate the document file 28 into a pre-map data file 40 respective to the first standard format.

Figure 4:
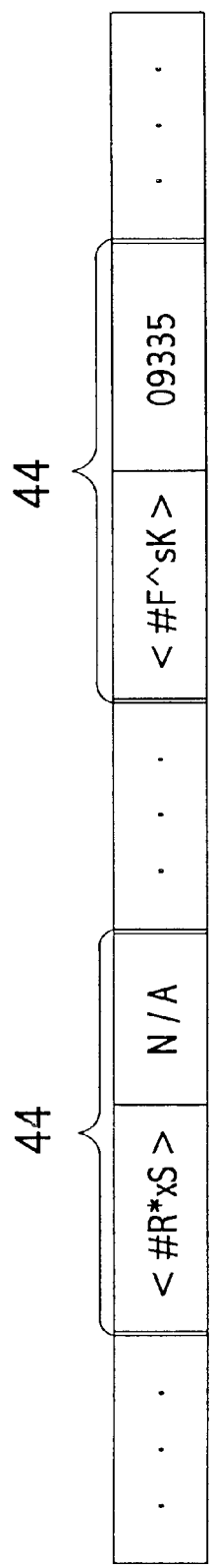
FIG. 4 is a schematic view of document files.
Figure 4:
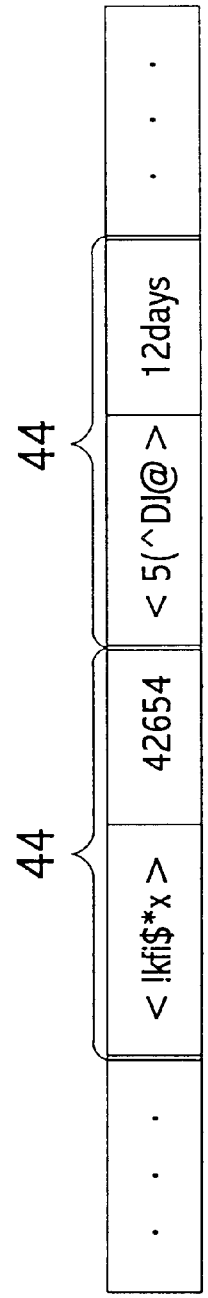
Figure 5:
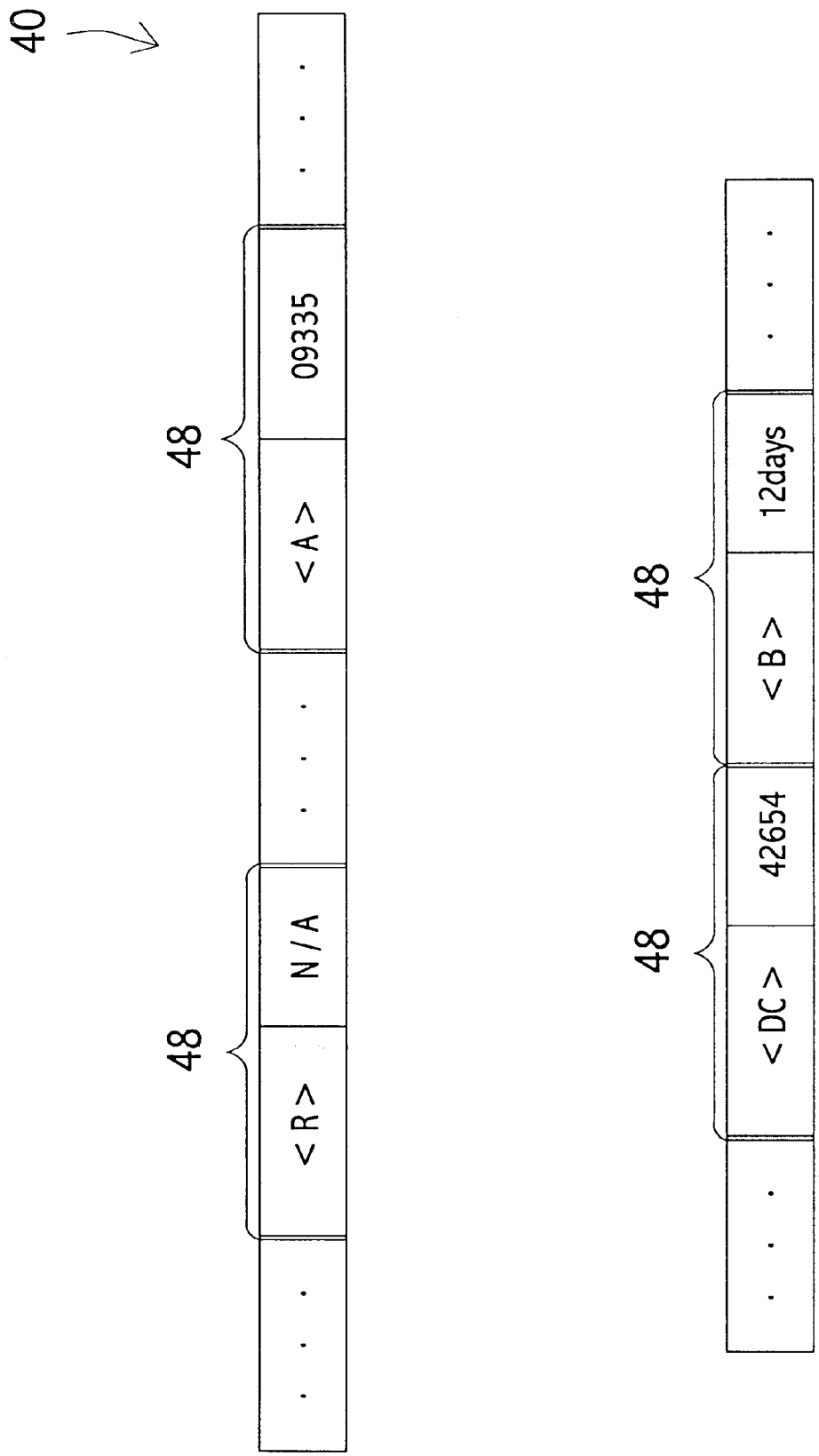
FIG. 5 is a schematic view of pre-map data files.

Referring now to FIG. 4, a schematic view of the document file 28 is present. The document file 28 includes a plurality of original data segments 44. Each original data segment 44 contains original data. On the other hand, referring to FIG. 5, a schematic view of the pre-map data file 40 is present. The pre-map data file 40 includes a plurality of pre-map data segments 48. Each pre-map data segment 48 contains pre-map data. During the translation, the data type definition/schema (DTD/schema) compiler 30 can utilize the compiling rule file 34 stored in the data type definition/ schema (DTD/schema) storage device 32, with respect to the specific document file type, to translate the original data in each the original data segment 44 into the pre-map data for further generating the pre-map data file 40. That is, during the translation, various document files with specific document file types such as order forms, invoices and so on, can be translated into respective pre-map data files 40 by applying respective compiling rule files 34.

In the present invention, the document file and the pre-map data file 40 can be written by the extensible markup language (XML), and the compiling rule file 34 can be written by the extensible style language (XSL).

In the present invention, the data type definition/schema (DTD/schema) compiler 30 is respective to the first standard format for translating the document file 28 with respective to the first standard format. Also, all the compiling rule files 34 are respective to the first standard format.

Referring now back to FIG. 3, after the document file 28 is translated into the pre-map data file 40, the data processing system 20 can use the mapper 26 to map the pre-map data file 40 onto a second standard format data file 42 with respect to a second standard format. Then, the second standard format data file 42 can be forwarded to a second data processing system for further electronic data exchanging.

Figure 6:
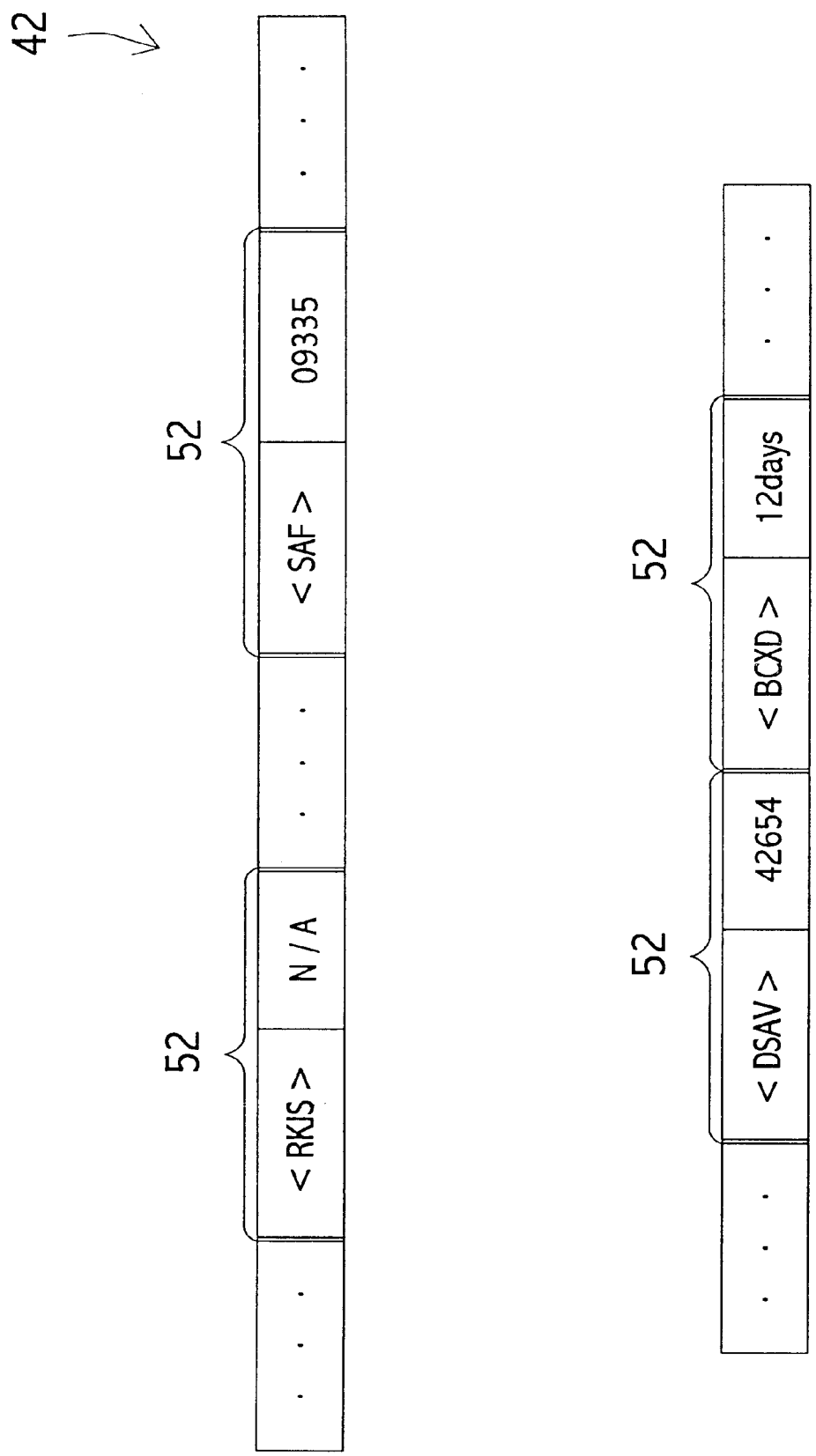
FIG. 6 is a schematic view of second standard format data files.

Referring now to FIG. 6, a schematic view of the second standard format data file 42 is shown. The second standard format data file 42 includes a plurality of second standard format data segments 52. Every second standard format data segment 52 contains second standard format data. During the mapping of the present invention, the mapper 26 can utilize mapping rules of the mapping rule file 38 stored in the mapping storage device 36, with respect to the second standard format, to map the pre-map data in each the pre-map data segment 52 onto the second standard format data respective to the second standard format for further generating the second standard format data file 42 respective to the second standard format. In this mapping, by providing the mapping rules respective to the second standard format, the pre-map data file 40 with respect to the first standard format is mapped onto the second standard format data file respective to the second standard format for further electronic exchange with the second data processing system with respect to the second standard format.

In the present invention, the second standard format data file 42 can be written by the extensible markup language (XML), and the mapping rule file 38 can be written by the extensible style language (XSL).

In the present invention, the pre-map data file 40 can include a translating factor for labeling the second standard format with respect to the second data processing system. During the mapping, in accordance with the translating factor, the mapper 26 can locate the mapping rule file 38 respective to the second standard format for mapping the pre-map data file 40 onto the second standard format data file 42 with respect to the second standard format.

In this invention, because the second standard format data file 42 arriving the second data processing system is prepared with respect to the second standard format, the second data processing system can thus translate the second standard format data file 42 directly into the document file respective to the second standard format and can then store the document file in the document database.

Figure 7:
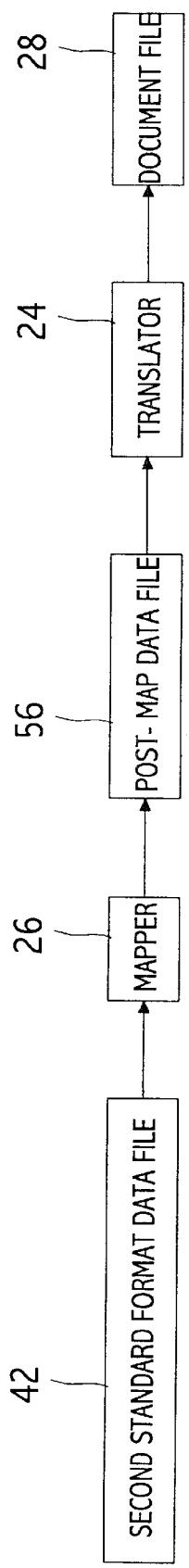
FIG. 7 is a flowchart showing the translating of a content format of a second standard format data provided by the data processing system of the present invention.

Referring now to FIG. 7, a flowchart showing the translating of a content format of the second standard format data file 42 in the data processing system 20 of the present invention is present. In the case that the data processing system 20 receives the second standard format data file 42 respective to the second standard format from another data processing system (say, the second data processing system), the data processing system 20 can utilize the mapper 26 to map the second standard format data file 42 onto a post-map data file 56 with respect to the first standard format.

Figure 8:
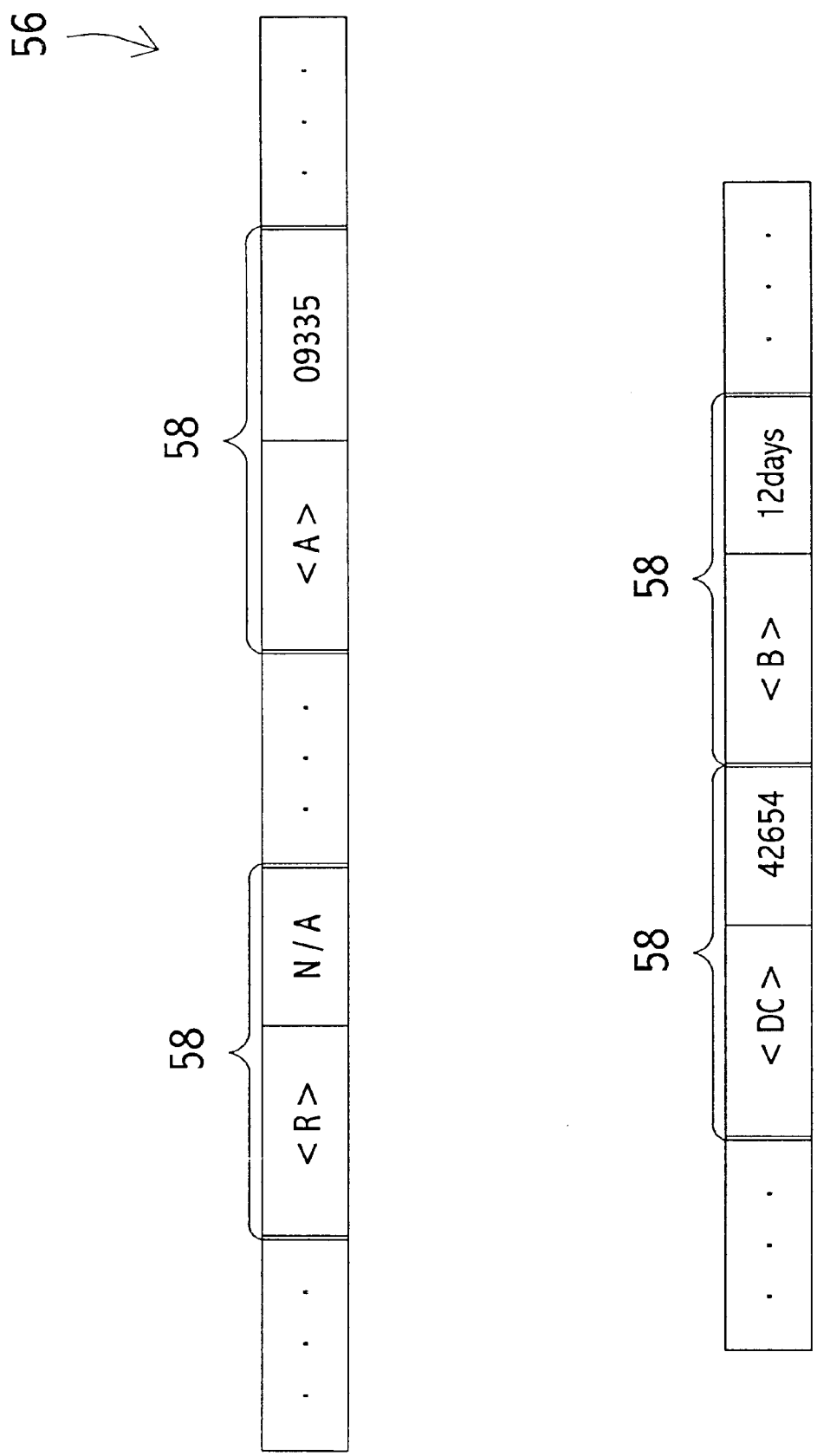
FIG. 8 is a schematic view of post-map data files.

Referring now to FIG. 8, a schematic view of the post-map data file 56 is present. The post-map data file 56 includes a plurality of post-map data segments 58. Each of the post-map data segments 58 contains post-map data. During the mapping, the mapper 26 can utilize the mapping rules of the mapping rule file 38 stored in the mapping storage device 36, with respect to the second standard format, to map the second standard format data in every second standard format data segments 52 onto the respective post-map data for further generating the post-map data file 56. In the present invention, the post-map data file 56 can be written by the extensible markup language (XML).

Referring now back to FIG. 7, after the second standard format data file 42 is mapped onto the post-map data file 56, the data processing system 20 can utilize the translator 24 to translate the post-map data file 56 into a document file 28 respective to the first standard format and then can store the document file 28 in the document database 22.

During the translation, the translator 24 can utilize the data type definition/schema (DTD/schema) compiler 30 and th e compiling rule files 34 in the data type definition/schema (DTD/schema) storage device 32 to translate the post-map data in every post-map data segments into the original data for further generating the document file 28 respective to the first standard format.

Figure 9:
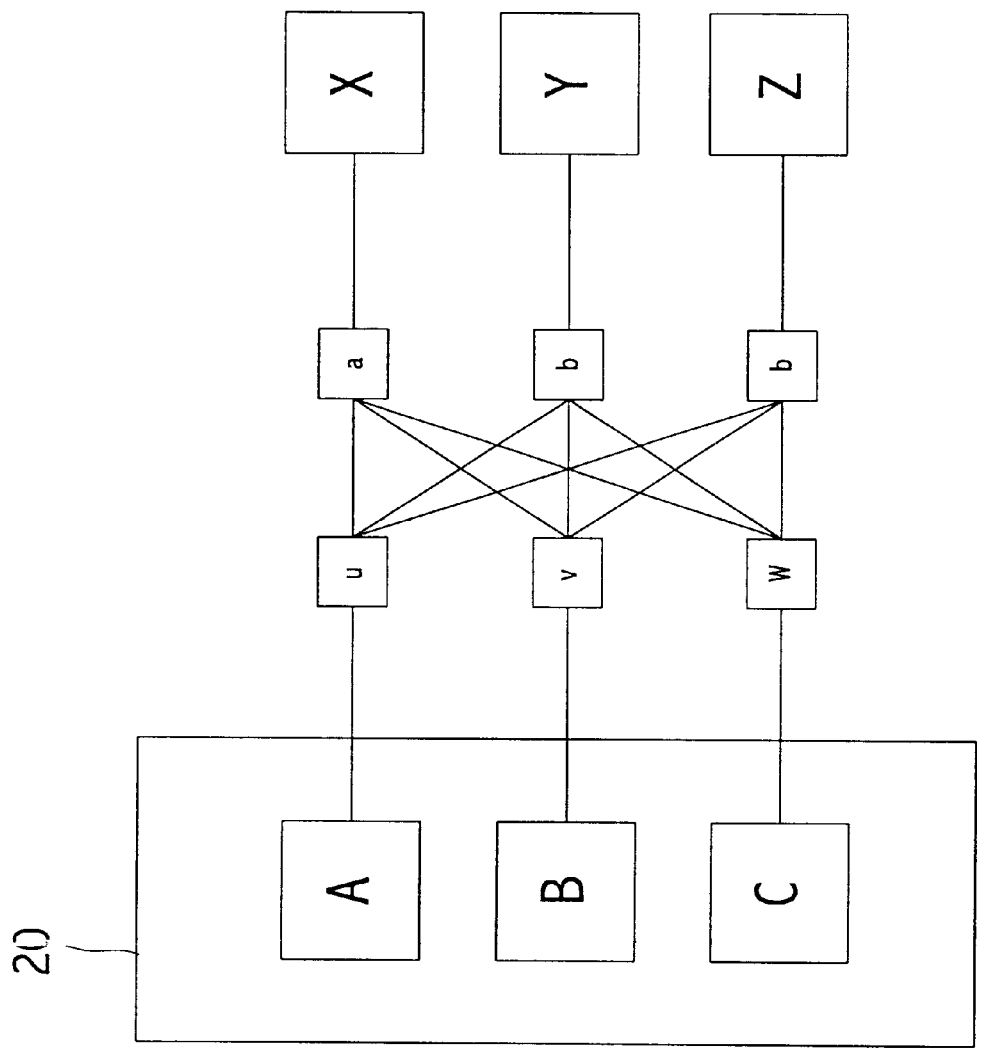
FIG. 9 is a schematic view showing the relationship between the data processing system of the present invention and some foreign data processing systems.

Referring now to FIG. 9, a schematic view is present to show the relationship of the data processing system 20 of the present invention with some foreign data processing systems X, Y and Z. As shown, the data processing system 20 includes three document files A, B and C with individual data contents; for example, an order form, an invoice and a receipt sheet, respectively. In the network environment of FIG. 9, the data processing system 20 needs to perform exchange of document files with these three foreign data processing systems X, Y and Z that have individual standard formats. As shown, the data processing system 20 can utilize three compiling rule files u, v and w to translate the document files A, B and C with different document file types into respective pre-map data files. Then, three mapping rule files a, b and c with different standard formats can be used to map the pre-map data files onto three standard format data with respect to three different standard format, for further performing electronic data exchange with the foreign data processing systems X, Y and Z. When comparing with the data processing system 10 of the prior art shown in the background section of this specification, the data processing system 20 of the present invention needs only six XSL files (u, v, w, a, b, c) to complete the document file exchange with three foreign data processing systems (X, Y, Z) having respective standard formats.

Therefore, in the case that the data processing system 20 of the present invention has M document file types and needs to perform electronic document exchange with N standard formats, the data processing system 20 needs to create M+N XSL files only. In addition, for each additional document file type, the data processing system requires simply one more XSL file (compiling rule file). Also, for each additional standard format, the data processing system or the present invention needs only an additional XSL file (mapping rule file).

While the present invention has been particularly shown and described with reference to a preferred embodiment, it will be understood by those skilled in the art that various changes in form and detail may be without departing from the spirit and scope of the present invention.

What is claimed is:

1. A method for translating a format of a content of document file, applied to a network environment with a plurality of data processing systems, each of the data processing systems having a respective document database further including a plurality of document files, the document files being referred to a plurality of document file types, the document files of each the document database being referred to a respective standard format, comprising:

while a first data processing system thereof intending to forward a document file thereof to a second data processing system thereof,
the first data processing system retrieving the document file with respect to a first standard format thereof from the respective document database thereof,
the first data processing system translating the document file with the first standard format into a pre-map data file respective to the first standard format, and
the first data processing system mapping the pre-map data file onto a second standard format data file respective to a second standard format and sending out the second standard format data file; and while the first data processing system receiving the second standard format data file from the second data processing system,
the first data processing system mapping the second standard format data file onto a post-map data file with respect to the first standard format, and
the first data processing system translating the post-map data file into the document file with respect to the first standard format and storing the document file with respect to the first format into the respective document data file.

2. The method for translating a format of a content of document file according to claim 1, wherein said document files, said pre-map data file, said second standard format data file and said post-map data file are written by extensive markup language (XML).

3. The method for translating a format of a content of document file according to claim 1, wherein said pre-map data file includes a translating factor for labeling said second standard format with respect to said document file of said second data processing system, and according to the translating factor, said first data processing system thereby map said pre-map data file onto said second standard format data file with respect to said second standard format and further send out said second standard format data file.

4. The method for translating a format of a content of document file according to claim 1, wherein said first data processing system further includes a data type definition/schema (DTD/schema) compiler for translating said document file and a data type definition/schema (DTD/schema) storage device for storing a plurality of compiling rule files, each of the compiling rule files being respective to one said document file type; while said first data processing system intending to forward said document file, the data type definition/schema (DTD/schema) compiler following the respective compiling rule file respective to said document file type to translate said document file of said first standard format to said respective pre-map data file; and while said first data processing system receiving said second standard format data file of said second standard format, the data type definition/schema (DTD/schema) compiler following the respective compiling rule file to translate said post-map data file to said respective document file of said first standard format for further being stored in said respective document database.

5. The method for translating a format of a content of document file according to claim 4, wherein said data type definition/schema (DTD/schema) compiler is respective to said first standard format.

6. The method for translating a format of a content of document file according to claim 4, wherein said compiling rule file is respective to said first standard format.

7. The method for translating a format of a content of document file according to claim 4, wherein said compiling rule file is written by extensible style language (XSL).

8. The method for translating a format of a content of document file according to claim 4, wherein said document file includes a plurality of original data segments for containing respective original data, wherein said pre-map data file includes a plurality of pre-map data segments for containing respective pre-map data, and wherein said post-map data file includes a plurality of post-map data segments for containing respective post-map data; while said first data processing system intending to forward said document file, said first data processing system utilizing said data type definition/schema (DTD/schema) compiler and said compiling rule files in said data type definition/schema (DTD/schema) storage device to translate the original data of each the original data segment into the respective pre-map data for further generating said pre-map data file; while said first data processing system receiving said second standard format data file of respective said second standard format, said first data processing system utilizing said data type definition/schema (DTD/schema) compiler and said compiling rule files in said data type definition/schema (DTD/schema) storage device to translate the post-map data of each the post-map data segment into the respective original data for further generating said document file respective to said first standard format.

9. The method for translating a format of a content of document file according to claim 1, wherein said first data processing system includes a mapper further having thereof a mapping storage device for storing a plurality of mapping rule files, each of the mapping rule files being respective to one said standard format; while said first data processing system intending to forward said document file, the mapper following mapping rules provided by the mapping rule file of the mapping storage device with respect to said second standard format to map said pre-map data file onto said second standard format data file with respect to said second standard format; and while said first data processing system receiving said second standard format data file of said second standard format, the mapper following the mapping rules provided by the mapping rule file of the mapping storage device with respect to said second standard format to map said second standard format data file onto said post-map data file.

10. The method for translating a format of a content of document file according to claim 9, wherein said mapping rule file is written by extensible style language (XSL).

11. The method for translating a format of a content of document file according to claim 9, wherein said pre-map data file includes a plurality of pre-map data segments for containing respective pre-map data, wherein said second standard format data file includes a plurality of second standard format data segments for containing respective second standard format data, and wherein said post-map data file includes a plurality of post-map data segments for containing respective post-map data; while said first data processing system intending to forward said document file, said mapper following said mapping rules provided by said mapping rule file of said mapping storage device with respect to said second standard format to map the pre-map data of each the pre-map data segment into the second standard format data with respect to said second standard format for further generating said second standard format data file with respect to said second standard format; and while said first data processing system receiving said second-standard format data file of said second standard format, the mapper following said mapping rules provided by said mapping rule file of the mapping storage device with respect to said second standard format to map the second standard format data of the second standard format data segment onto said post-map data file for further generating said post-map data file.

12. A system for translating a format of a content of document file, applied to a network environment with a plurality of data processing systems, each of the data processing systems comprising:

a document database, further including a plurality of document files, the document files being referred to a plurality of document file types, the document files of each the document database being referred to a respective standard format; and a first data processing system, having document files respective individually to first standard formats, further including:

a translator for translating the document file of the first standard format into a pre-map data file and for translating a post-map data file into another document file with respect to the first standard format, both the pre-map data file and the post-map data file being respective to the first standard format; and a mapper for mapping the pre-map data file onto a second standard format data file with respect to a second standard format and for further mapping the second standard format data file onto the post-map data file;

while the first data processing system thereof intending to forward a document file thereof to a second data processing system thereof with respect to the second standard format, the first data processing system retrieving the document file with respect to the first standard format thereof from the document database, the translator translating the document file with the first standard format into a pre-map data file, the mapper mapping the pre-map data file onto the second standard format data file with respect to the second standard format, and the first data processing system sending out the second standard format data file; and while the first data processing system receiving the second standard format data file with the second standard format, the mapper mapping the second standard format data file onto the post-map data file, the translator translating the post-map data file into the document file with respect to the first standard format and storing the document file with respect to the first format into the respective document data file.

13. The system for translating a format of a content of document file according to claim 12, wherein said document files, said pre-map data file, said second standard format data file and said post-map data file are written by extensive markup language (XML).

14. The system for translating a format of a content of document file according to claim 12, wherein said pre-map data file includes a translating factor for labeling said second standard format with respect to said document file of said second data processing system, and according to the translating factor, said first data processing system thereby map said pre-map data file onto said second standard format data file with respect to said second standard format and further send out said second standard format data file.

15. The system for translating a format of a content of document file according to claim 12, wherein said translator further includes a data file definition/schema translator for translating said document file and a data type definition/schema (DTD/schema) storage device for storing a plurality of compiling rule files, each of the compiling rule files being respective to one said document file type; while said first data processing system intending to forward said document file, the data type definition/schema (DTD/schema) compiler following the respective compiling rule file respective to said document file type to translate said document file of said first standard format to said respective pre-map data file; and while said first data processing system receiving said second standard format data file of said second standard format, the data type definition/schema (DTD/schema) compiler following the respective compiling rule file to translate said post-map data file to said respective document file of said first standard format for further being stored in said respective document database.

16. The system for translating a format of a content of document file according to claim 15, wherein said data type definition/schema (DTD/schema) compiler is respective to said first standard format.

17. The system for translating a format of a content of document file according to claim 15, wherein said compiling rule file is respective to said first standard format.

18. The system for translating a format of a content of document file according to claim 15, wherein said compiling rule file is written by extensible style language (XSL).

19. The system for translating a format of a content of document file according to claim 15, wherein said document file includes a plurality of original data segments for containing respective original data, wherein said pre-map data file includes a plurality of pre-map data segments for containing respective pre-map data, and wherein said post-map data file includes a plurality of post-map data segments for containing respective post-map data; while said first data processing system intending to forward said document file, said first data processing system utilizing said data type definition/schema (DTD/schema) compiler and said compiling rule files in said data type definition/schema (DTD/schema) storage device to translate the original data of each the original data segment into the respective pre-map data for further generating said pre-map data file; while said first data processing system receiving said second standard format data file of respective said second standard format, said first data processing system utilizing said data type definition/schema (DTD/schema) compiler and said compiling rule files in said data type definition/schema (DTD/schema) storage device to translate the post-map data of each the post-map data segment into the respective original data for further generating said document file respective to said first standard format.

20. The system for translating a format of a content of document file according to claim 12, wherein said first data processing system includes a mapper further having thereof a mapping storage device for storing a plurality of mapping rule files, each of the mapping rule files being respective to one said standard format; while said first data processing system intending to forward said document file, the mapper following mapping rules provided by the mapping rule file of the mapping storage device with respect to said second standard format to map said pre-map data file onto said second standard format data file with respect to said second standard format; and while said first data processing system receiving said second standard format data file of said second standard format, the mapper following the mapping rules provided by the mapping rule file of the mapping storage device with respect to said second standard format to map said second standard format data file onto said post-map data file.

21. The system for translating a format of a content of document file according to claim 20, wherein said mapping rule file is written by extensible style language (XSL).

22. The system for translating a format of a content of document file according to claim 20, wherein said pre-map data file includes a plurality of pre-map data segments for containing respective pre-map data, wherein said second standard format data file includes a plurality of second standard format data segments for containing respective second standard format data, and wherein said post-map data file includes a plurality of post-map data segments for containing respective post-map data; while said first data processing system intending to forward said document file, said mapper following said mapping rules provided by said mapping rule file of said mapping storage device with respect to said second standard format to map the pre-map data of each the pre-map data segment into the second standard format data with respect to said second standard format for further generating said second standard format data file with respect to said second standard format; and while said first data processing system receiving said second standard format data file of said second standard format, the mapper following said mapping rules provided by said mapping rule file of the mapping storage device with respect to said second standard format to map the second standard format data of the second standard format data segment onto said post-map data file for further generating said post-map data file.

* * * * *